US005385968A

United States Patent [19]

Bowman et al.

[11] Patent Number: 5,385,968

[45] Date of Patent: Jan. 31, 1995

[54] AQUEOUS COATING COMPOSITIONS FOR ANTISTAT LAYERS HAVING PRINT RETAINING QUALITIES

[75] Inventors: Wayne A. Bowman, Walworth; Mario D. DeLaura; Norman S. Edgett, both of Rochester, all of N.Y.

[73] Assignee: Eastman Kodak Company, Rochester, N.Y.

[21] Appl. No.: 73,188

[22] Filed: Jun. 8, 1993

Related U.S. Application Data

[62] Division of Ser. No. 840,475, Feb. 24, 1992, Pat. No. 5,244,728.

[51] Int. Cl.[6] .......................... C08J 5/10; C08K 3/34; C08L 33/12

[52] U.S. Cl. .................................... 524/493; 524/366; 524/376; 524/377; 524/419; 524/428; 524/429; 524/444; 524/492; 524/494

[58] Field of Search ............... 524/444, 493, 376, 377, 524/492, 494, 366, 419, 428, 429

[56] References Cited

U.S. PATENT DOCUMENTS

| | | | |
|---|---|---|---|
| 3,525,621 | 8/1970 | Miller | 96/85 |
| 4,197,127 | 4/1980 | Mecca | 430/628 |
| 4,542,095 | 9/1985 | Steklenski et al. | 430/527 |
| 4,582,783 | 4/1986 | Nittel et al. | 430/529 |
| 4,610,924 | 9/1986 | Tamagawa et al. | 428/331 |
| 4,678,742 | 7/1987 | Tamagawa et al. | 430/523 |
| 4,895,792 | 1/1990 | Aizawa et al. | 430/530 |
| 5,045,394 | 9/1991 | Saverin et al. | 428/402 |
| 5,075,164 | 12/1991 | Bowman et al. | 428/325 |

*Primary Examiner*—Paul R. Michl
*Assistant Examiner*—U. K. Rajguru
*Attorney, Agent, or Firm*—Robert A. Gerlach

[57] ABSTRACT

An aqueous coating composition for applying a print retaining antistatic layer consisting essentially of an aluminum modified colloidal silica and an antistatic agent in a binder polymer, the binder polymer consisting essentially of an addition product of from about 30 to 78 mol % of an alkyl methacrylate wherein the alkyl group has from 3 to 8 carbon atoms, from about 2 to about 10 mol % of an alkali metal salt of an ethylenically unsaturated sulfonic acid and from 20 to about 65 mol % of a vinyl benzene, the polymer having a glass transition point of from 30° to 65° C.

8 Claims, No Drawings

AQUEOUS COATING COMPOSITIONS FOR ANTISTAT LAYERS HAVING PRINT RETAINING QUALITIES

This is a divisional of application Ser. No. 840,475, filed Feb. 24, 1992, now U.S. Pat. No. 5,214,728.

BACKGROUND OF THE INVENTION

1. Field of the Invention

This invention relates to antistatic layers having print retaining qualities and to coating compositions suitable for the preparation thereof. More particularly, this invention relates to polyolefin coated photographic paper supports having on one side thereof a coating of a polymer capable of receiving and retaining various types of marking including, printing ink and the like.

DESCRIPTION OF RELATED ART

U.S. Pat. No. 5,075,164 discloses a photographic paper having a polyolefin layer bearing a print retaining layer which requires a granular tooth providing ingredient and a binder copolymer. While such photographic papers give excellent results with regard to retention of the indicia provided on the print retaining layer when passed through most automatic processors, they are not satisfactory in print retention when passed through automatic processors having more stringent conditions. For example, in processors that move the photographic paper through its various stations by means of a track or belt that engages the back of the paper, the print retaining layer is damaged or in some cases removed, thus rendering the information applied thereto prior to development, undecipherable. Also, in the preparation of the photographic elements various deficiencies, such as blocking, incompatibility of ingredients and pick off during the coating application process are likely to occur.

SUMMARY OF THE INVENTION

This invention provides a photographic paper coated with a polyolefin resin layer on each surface, one of the free surfaces of one of the polyolefin layers bearing a print retaining antistatic layer, the print retaining antistatic layer consisting essentially of an aluminum modified colloidal silica and an antistatic agent in a binder polymer, the binder polymer consisting essentially of an addition product of from about 30 to 78 mol % of an alkyl methacrylate wherein the alkyl group has from 3 to 8 carbon atoms, from about 2 to about 10 mol % of an alkali metal salt of an ethylenically unsaturated sulfonic acid and from 20 to about 65 mol % of a vinyl benzene, the polymer having a glass transition point of from 30° to 65° C.

The invention also contemplates an aqueous coating compositions for providing a print retaining layer to a surface, the compositions including from about 4 to 12 wt % of an aluminum modified colloidal silica, such as, Ludox AM, sold by Du Pont Co.; about 0.6 to about 2.4 wt % of an antistatic agent, from about 3 to about 18 wt % of the latex binder polymer indicated above, from about 5 to about 10 wt % of a defoaming agent and the balance water. These coating solutions have excellent solution stability, without destabilization of the latex to form coagulum.

DESCRIPTION OF THE PREFERRED EMBODIMENTS

While the invention herein finds particular use in the photofinishing industry to print bar codes or other indicia on the back of paper prints by using dot matrix printers for example, the invention described herein is useful and suitable for applying print or ink markings to any surface wherein the original surface does not possess the desired characteristics. The application with regard to photofinishing however is a particularly stringent requirement because the coding and the indicia impressed thereon must survive photographic processing through the automatic processing devices having the harshest conditions in order to be useful. In photofinishing applications, the coating compositions, including the binder therefore must possess the following requirements:

1. The ingredients must be compatible. This is a particularly stringent requirement when antistatic agents are employed in the coating composition in order that the print retaining layer also possess antistatic properties. The binder polymer in the coating composition in the form of a latex can be easily destabilized causing agglomeration of the latex particles to occur.
2. The coatings must be resistant to pick off during conveyance through roller/nip transport machines in the preparation of the photographic paper and also in the development processor.
3. The coatings must be block resistant in the rolled form. That is, in preparation of printing paper for use in photographic applications, the paper in processing is rolled upon itself. It is necessary that the write retaining layer does not block together with the opposite surface of the paper support.
4. The coatings must be alkali resistance to a pH of 10 in order to survive the photographic processing solutions.
5. The coatings must be resistant to discoloration either due to the processing solutions or to aging.
6. The coatings must be able to both receive and retain ink or other marking materials through the photographic processing.
7. The coatings must not be photoactive and interfere with the light sensitive portions of the photographic paper.
8. The coatings must have a stability of from 6 to 12 months in order to be commercially acceptable.
9. The coatings must have resistivity less than 12 log ohms at 50% relative humidity.

The coatings and the coating compositions in accordance with this invention satisfy these requirements by utilizing in combination an aluminum modified colloidal silica, an antistatic agent and a latex binder polymer, the binder polymer being the addition product of from about 30 to 78 mol % of an alkyl methacrylate wherein the alkyl group has from 3 to 8 carbon atoms, from about 2 to about 10 mol % of an alkali metal salt of an ethylenically unsaturated sulfonic acid and 20 to 65 mol % of a vinyl benzene monomer where the polymer has a glass transition temperature of from about 30° to about 65° C., preferably from about 30° C. to about 60° C. Optionally, the latex may also include up to 50 mol % of an alkylmethacrylate having less than three carbon atoms in the alkyl group, so long as the $T_g$ is within the range set forth above.

The ratio of the weight of the binder polymer to the weight of the aluminum modified colloidal silica can vary from about 1:18 to about 36:1, however, a weight ratio of from about 1:1.3 to about 2.8:1 is preferred to achieve superior backmark retention. Best results are obtained when the ratio by weight of binder polymer to aluminum modified colloidal silica varies from about 1.1:1 to 1.2:1.

In the preparation of the latex binder polymer, any suitable alkyl methacrylate having from 3 to 8 carbon atoms in the alkyl group may be used such as, for example, n-propyl methacrylate, isopropyl methacrylate, n-butyl methacrylate, isobutyl methacrylate, tertiary butyl methacrylate, n-pentyl methacrylate, 2-methyl butyl methacrylate, 2-dimethyl propyl methacrylate, hexyl methacrylate, 2-methyl pentyl methacrylate, 2-4-dimethyl butyl methacrylate, heptyl methacrylate, 2-methyl hexyl methacrylate, octyl methacrylate, 4-methyl heptyl methacrylate and the like. It is preferred to use butyl methacrylate, most preferably n-butyl-methacrylate as this ingredient has a strong influence on the $T_g$ of the latex polymer and thereby the blocking characteristics of the binder polymer and the coating characteristics of the coating composition. The alkyl methacrylate preferably is used in an amount of from about 30 to about 75 mol %.

Any suitable ethylenically unsaturated sulfonic acid may be used in the preparation of the latex polymers in accordance with this invention such as for example, the sodium, potassium and lithium salts of sulfoethyl methacrylate, sulfoethyl acrylate or 2-acrylamino-2-methyl-propanesulfonic acid. This ingredient is utilized in an amount of from about 2 to about 10 mol % and preferably from about 5 to about 10 mol % in order to render the latex polymer compatible with the other coating ingredients, particularly the defoaming agent which, if not compatible, will cause the destabilization and agglomeration of the latex thus rendering the polymer incapable of being coated. Sodium 2-sulfoethyl methacrylate is the preferred material.

A vinylbenzene monomer is employed in the preparation of the latex polymer in accordance with this invention in an amount of 20 to about 65 mol % preferably in an amount of from about 20 to about 60 mol % and most preferably from about 28 to about 35 mol %. Suitable vinylbenzene monomers include styrene or substituted styrene monomers such as, vinyl toluene p-ethyl styrene, p-tertiary butyl styrene, and the like. Further, the vinyl portion may also be substituted by an alkyl group such as a methyl group, an ethyl group and the like such as, alpha methyl styrene. While styrene itself is preferred, other vinyl benzene monomers may be employed in like amounts.

The binder polymers in accordance with this invention are prepared by emulsion polymerization techniques employing suitable stabilizing agents to obtain a latex polymer of approximately 30% by weight solids in water. A particularly suitable stabilizing agent is Dowfax 2A1, a branched $C_{12}$ alkylated disulfonated diphenyloxide. Coating compositions in accordance with this invention are prepared by adding a defoaming agent and an antistatic agent in the proper proportions to the latex/water emulsion and then adjusting the water content to the proper concentration.

A defoaming agent is necessarily included in the coating composition and this defoaming agent must be compatible with the latex binder polymer in order that the latex does not destabilize or agglomerate. While any suitable defoaming agent may be employed, monohydric alcohols are preferred. Those having a carbon atom content of from 3 to 5 are more preferred, while isobutanol is the most preferred defoaming agent.

The antistatic agent is included in the preparation of the coating composition. Any suitable antistatic agent, such as, those set forth in Paragraph XIII, of Research Disclosure 308119, December 1989, may be employed, however, the non-ionic surface-active polymers in conjunction with the alkali metal salts described in U.S. Pat. No. 4,542,095, which is totally incorporated herein by reference are preferred. The combination of a polyethylene ether glycol with lithium nitrate is the most preferred antistatic agent. During the course of the addition of the various ingredients, the emulsion is maintained under constant agitation and subsequently thereto the agitation is continued for at least 30 min.

When a photographic paper containing a polyolefin layer on either side thereof is to be treated in accordance with this invention with a composition to impart ink retention to the surface, it is preferred that the polyolefin layer first be corona discharge treated. The coating composition is coated at a coverage of between about 0.15 g/m$^2$ to about 1.5 g/m$^2$. The composition is applied by any conventional method for coating aqueous solutions, such as direct or offset gravure and dried at temperatures between 90° and 170° F. Both color and black and white photosensitive papers may be coated in accordance with this invention. While different photosensitive elements may require different coverages, for example, black and white coverages are generally on the order of from about 0.20 to about 1.2 g/m$^2$ while color coverages are generally on the order of 0.05 to about 0.8 g/m$^2$, different coverage values may be applied depending upon the particular application to which the print retaining layer applied is to be used. The layers prepared in accordance with this invention exhibit resistivities less than 12 log ohms at 50% relative humidity and preferably from about 8 to 12 log ohms.

The invention will be further illustrated by the following examples:

EXAMPLE 1

A latex copolymer having the composition 30 mol % styrene-60 mol % n-butyl methacrylate 10 mol % sodium 2-sulfoethyl methacrylate was prepared as follows: to a 1 L addition flask was added 225 ml of degased distilled water, 14 ml of a 45% solution of Dowfax 2A1 in water sold by Dow Chemical, 68.9 g of styrene, 188 g of butyl methacrylate, and 42.8 g of 2-sulfoethyl methacrylate. The mixture was stirred under nitrogen. To a 2 L reaction flask was added 475 mL of degased distilled water and 14 mL of 45% Dowfax 2A1. The flask was placed in an 80° C. bath. 3.0 g of potassium persulfate and 1 g of sodium meta bisulfite were added, immediately followed by the contents of the addition flask over a period of 40 min. The flask was stirred at 80° C. under nitrogen for 2 hrs. and then cooled. The pH of the latex was adjusted to 7 with 10% sodium hydroxide. The latex was filtered to remove a small amount of coagulum and contained 30% solids. The latex polymer has a $T_g$ of 41° C.

Example 1 sets forth the method of preparation of the specific latex polymers recorded in Table 1, monomers being utilized in amounts to obtain the stated mol %.

TABLE I

| Example No. | Tg °C. | Composition |
|---|---|---|
| 1 | 41 | styrene-co-butylmethacrylate-co-sodium 2-sulfoethyl methacrylate 30/60/10 |
| 2 | 50 | styrene-co-butylmethacrylate-co-sodium 2-sulfoethyl methacrylate 50/45/5 |
| 3 | 41 | styrene-co-butylmethacrylate-co-sodium 2-acrylamido 2-methylpropane sulfonic acid 30/60/10 |
| 4 | 50 | styrene-co-butylmethacrylate-co-sodium 2-acrylamido-2-methylpropane sulfonic acid 50/45/5 |

Coating compositions were prepared having the following formulations wherein, each of the 4 latex copolymers above were employed in the same % by weight:

TABLE II

| Component | Formula Solution wt % |
|---|---|
| Latex | 7.00 |
| Ludox AM | 5.95 |
| $LiNO_3$ - Antistat | 0.42 |
| Carbrowax 3350 - Antistat | 0.63 |
| Isobutanol | 8.00 |
| Water | 78.00 |

Each of the coating compositions utilizing the latex copolymers of Examples 1–4 were gravure coated onto the back side, the side opposite the light sensitive layer, of a corona discharge treated photographic paper having a polyethylene layer on both sides thereof in a coverage of 0.3 g/m$^2$. The compositions were dried between 90° and 130° F.

Each of the resulting 4 paper samples were subjected to the three following tests:

Carver Press Test—Two sheets of the coated paper were placed in a Carver Press back to back at 120° F. and 14,000 psi for 2 min. The sheets were removed from the press and evaluated for sticking on a scale of "0" to "5", where "0" rating indicates the sheets fall apart and a "5" rating indicates the sheets are blocked together.

Ink Retention Test—A printed image is applied onto the coated papers prepared as above using a pre-process ribbon print. The paper was then passed through a conventional processor, using conventional processing chemistry Ektacolor EP-2 and RA-4 and evaluated for print retention. A rating of "1" indicates no difference between the preprocessed and postprocessed print while a rating of "5" indicates that no ink survives the processing.

Autopan Test=A 10"×40" sample is passed through a belt-driven Autopan photographic processor, using conventional Ektacolor EP-2 or Ektacolor RA-4 chemistries. Wet abrasion resistance is visualized by contacting with an absorbing dye solution followed by a qualitative evaluation. The Autopan rest is a measurement of how well the antistat coating resists abrasion scratching during processing. This test is essentially a wet abrasion test.

Surface Resistivity Test—This test measures the surface resistivity of photographic papers. Samples are pre-conditioned at 5% RH, 72° F. for 16 hours followed by conditioning at test conditions, 20% RH or 50% RH, 72° F. for 30 minutes prior to testing. Surface resistivity is measured with a Keithley Model 616 digital electrometer using custom-made electrodes.

TABLE III

| | | Coated Properties | | | | | | |
|---|---|---|---|---|---|---|---|---|
| | | Backmark Retention | | Autopan Adhesion | | Surface Resistivity Log-Ohms | | |
| Example | Coverage g/m$^2$ | EP-2 | RA-4 | EP-2 | RA-4 | 20% RH | 50% RH | Carver Press Blocking |
| 1 | 0.19 | 1 | 1 | 3 | 1 | 13.6 | 11.0 | 0 |
| 2 | 0.21 | 1 | 1 | 3 | 1 | 13.7 | 11.2 | 0 |
| 3 | 0.22 | 1 | 1 | 3 | 1 | 13.9 | 11.5 | 0 |
| 4 | 0.15 | 1 | 1 | 3 | 1 | 13.8 | 12.0 | 0 |

Rating scale for Backmark Retention and Autopan Adhesion;
1 = Outstanding, very little difference between processed and unprocessed property appearance.
2 = Excellent, slight degradation of property appearance.
3 = Acceptable, medium degradation of property appearance.
4 = Unacceptable, serious degradation of property appearance.
5 = Unacceptable, total degradation.

TABLE IV

| | Composition for Optimum Backmark Retention | | | |
|---|---|---|---|---|
| Example | Latex Example 1 | Dry Wt % Ludox AM | Antistat Pair | Backmark Retention Rating |
| 5 | 0 | 92.5 | 7.5 | 5 |
| 6 | 5 | 87.5 | 7.5 | 3 |
| 7 | 18 | 74.5 | 7.5 | 2 |
| 8 | 40 | 52.5 | 7.5 | 1 |
| 9 | 50 | 42.5 | 7.5 | <1 |
| 10 | 68 | 24.5 | 7.5 | 1 |
| 11 | 90 | 2.5 | 7.5 | 2 |

What is claimed is:

1. An aqueous coating composition for providing a print retaining layer to a surface consisting essentially of 4 to about 12 wt % of an aluminum modified colloidal silica, from about 0.6 to about 2.4 wt % of an antistatic agent, from about 3 to 18 wt % of a latex binder polymer consisting essentially of the addition product of from about 30 to about 78 mol % of an alkylmethacrylate wherein the alkyl group has from 3 to 8 carbon atoms, from about 2 to about 10 mol % of an alkali metal salt of a ethylenically unsaturated sulfonic acid and from 20 to about 65 mol % of a vinyl benzene monomer, said binder polymer having a $T_g$ of from 30° C. to 65° C., from about 5 to about 10 wt % of a defoaming agent and the balance water.

2. The coating composition of claim 1 wherein an antistatic agent is from about 0.2 to about 0.7 wt % of polyethylene ether glycol and from about 0.2 to about 0.5 wt % of an alkali metal salt.

3. The aqueous coating composition of claim 1 wherein the defoaming agent is an alkanol having 3 to 8 carbon atoms.

4. The aqueous coating composition of claim 3 wherein the defoaming agent is isobutanol.

5. The aqueous coating composition of claim 2 wherein the alkali metal salt is lithium nitrate.

6. The aqueous coating composition of claim 1 wherein the latex polymer is prepared by emulsion polymerization in an aqueous medium having incorporated therein a stabilizing agent.

7. The aqueous coating composition of claim 6 wherein the stabilizing agent is an alkylated disulfonated diphenyloxide.

8. The aqueous coating composition of claim 1 wherein the latex binder polymer is a terpolymer of n-butylmethacrylate, sodium salt of 2 sulfoethyl methacrylate and styrene.

* * * * *